United States Patent
Williams et al.

[11] Patent Number: 6,105,700
[45] Date of Patent: Aug. 22, 2000

[54] MOTORCYCLE SWINGARM COVER

[75] Inventors: Geoffrey Thomas Williams, Mequon, Wis.; Wyatt S. Fuller, Hickory, N.C.

[73] Assignee: Harley-Davidson Motor Company, Milwaukee, Wis.

[21] Appl. No.: 08/900,944

[22] Filed: Jul. 25, 1997

[51] Int. Cl.[7] .................................................. B62D 25/16
[52] U.S. Cl. ........................ 180/219; 280/152.1; 474/144
[58] Field of Search ........................... 180/84, 227, 219; 280/288, 284, 152.1, 152.2, 157, 159; 474/144; D12/126, 127

[56] References Cited

U.S. PATENT DOCUMENTS

| | | | |
|---|---|---|---|
| D. 339,554 | 9/1993 | Davidson | D12/126 |
| D. 362,210 | 9/1995 | Haney | D12/126 |
| D. 407,351 | 3/1999 | Williams et al. | D12/126 |
| 3,885,471 | 5/1975 | Morine | 474/144 |
| 4,366,880 | 1/1983 | Miller | 180/219 |
| 4,967,867 | 11/1990 | Fuller | 180/219 |
| 5,546,665 | 8/1996 | Jackmauth | 33/203 |
| 5,881,835 | 3/1999 | Lucht et al. | 180/219 |

OTHER PUBLICATIONS

Harley–Davidson 1994 V–Twin Manufacturing Catalog, p. 479.

1994 Harley–Davidson Genuine parts & Acessories Catalog, pp. 11, 28 and 59.

Harley–Davidson 1994 Custom Chrome Catalog, p. 600.

1995 Harley–Davidson Genuine Parts & Accessories Catalog, pp. 65 and 175.

*Primary Examiner*—Kevin Hurley
*Assistant Examiner*—Andrew Ririe
*Attorney, Agent, or Firm*—Michael Best & Friedrich LLP

[57] ABSTRACT

A swingarm cover adapted to be mounted on a motorcycle swingarm and covering at least a portion of the outer face and at least a portion of the end face of the swingarm. For example, the cover can be designed to cover at least a portion of both the rear axle and the adjuster of the motorcycle. Preferably, the cover includes an opening for providing access to the rear axle, and an outer member detachably mounted to the cover and positioned to cover the opening. The cover can be secured to the swingarm by a clamping bar adapted to positioned against an inner face of the swingarm and interconnected with the cover to maintain the cover mounted on the swingarm. The cover can further include a notch for receiving a belt guard mounting arm of the motorcycle. Preferably, the cover wraps around at least a portion of the upper face and the lower face of the swingarm.

16 Claims, 3 Drawing Sheets

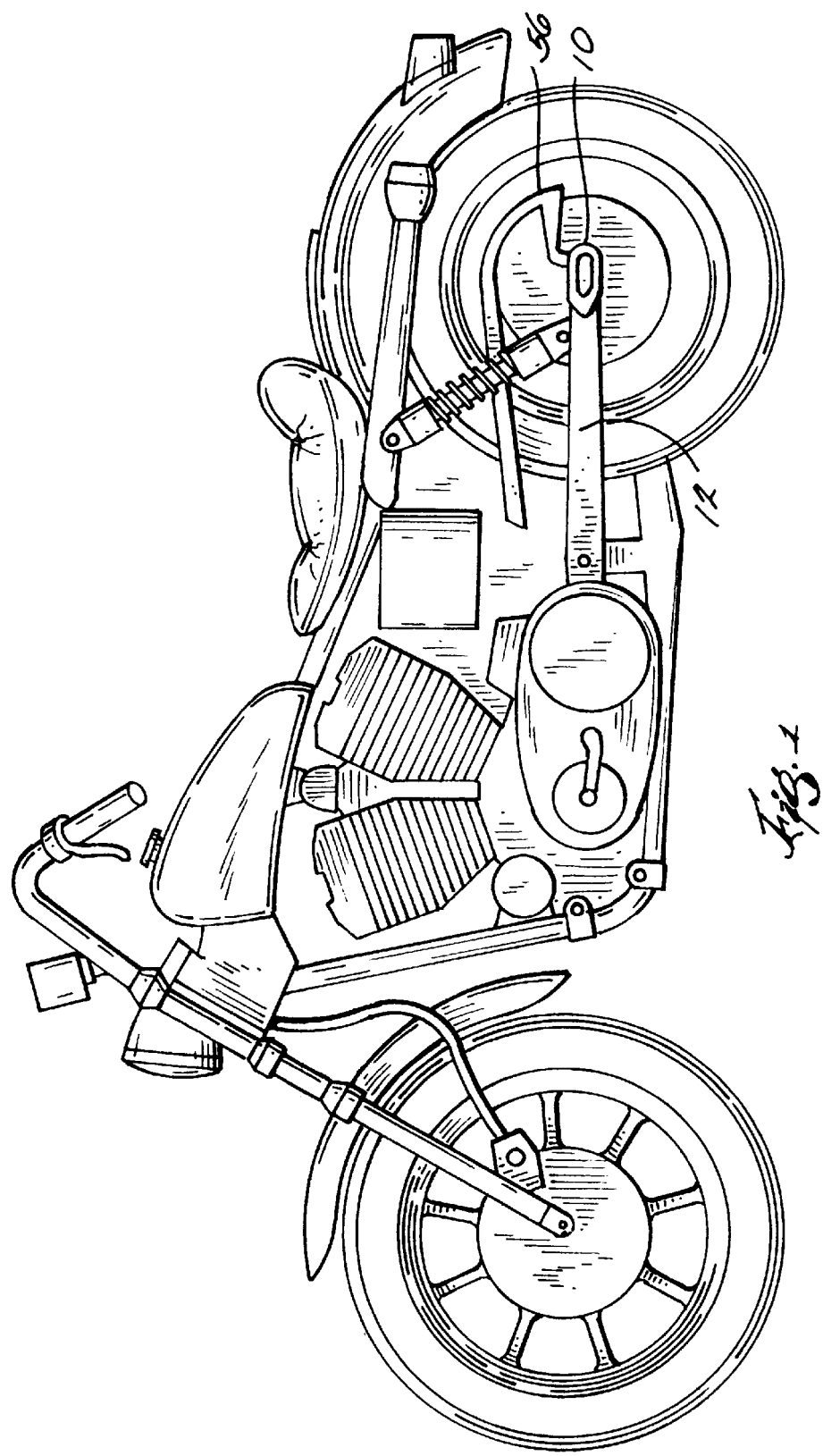

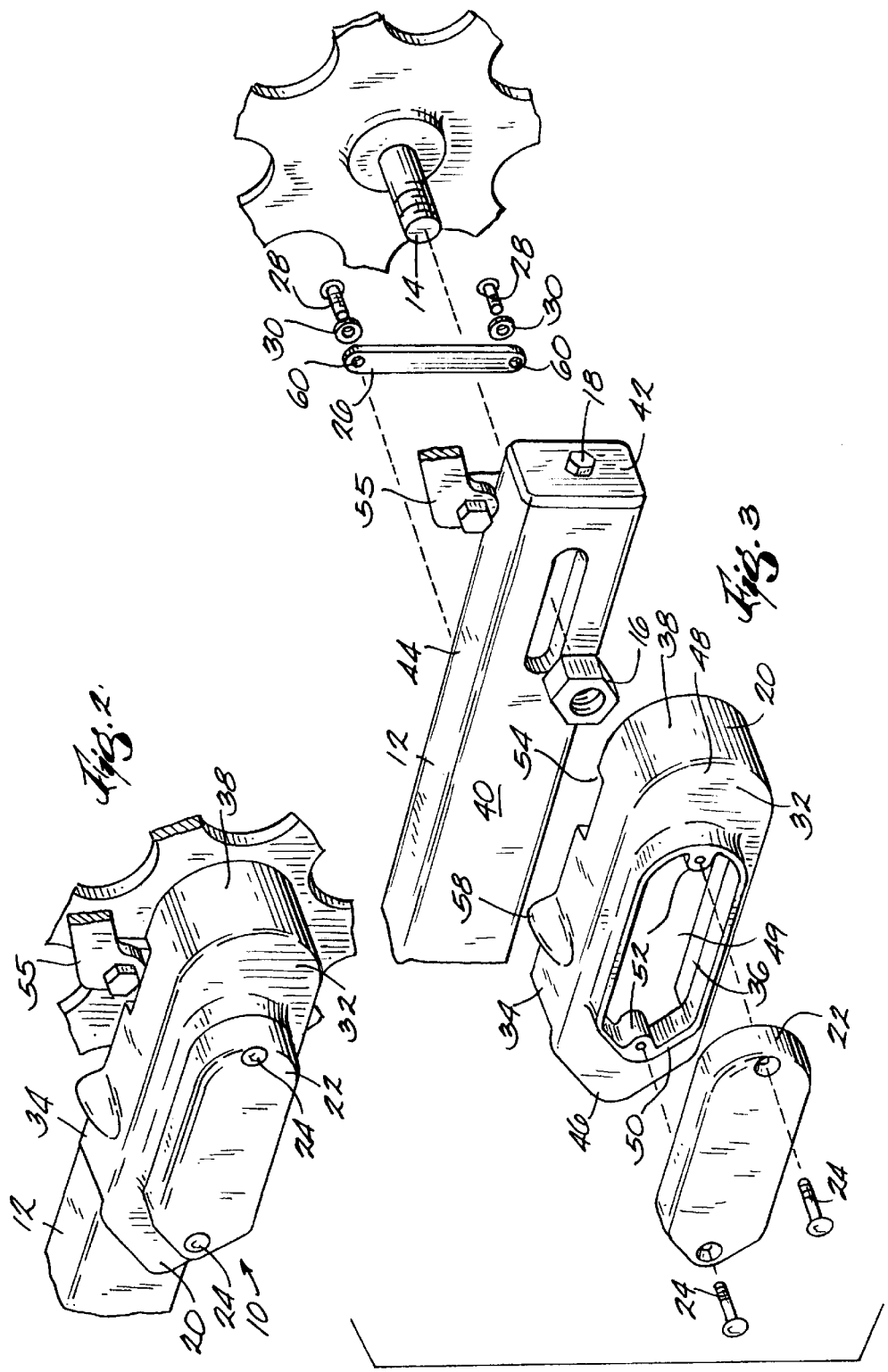

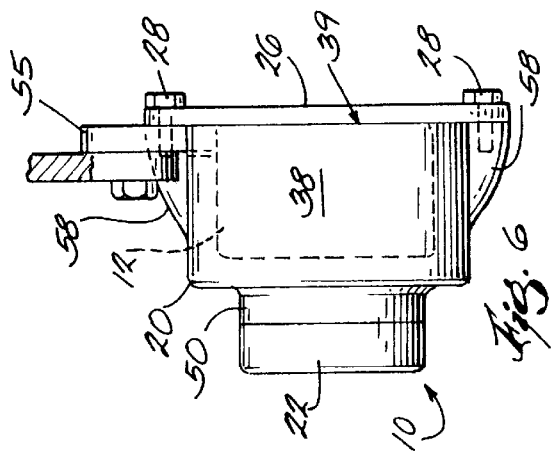
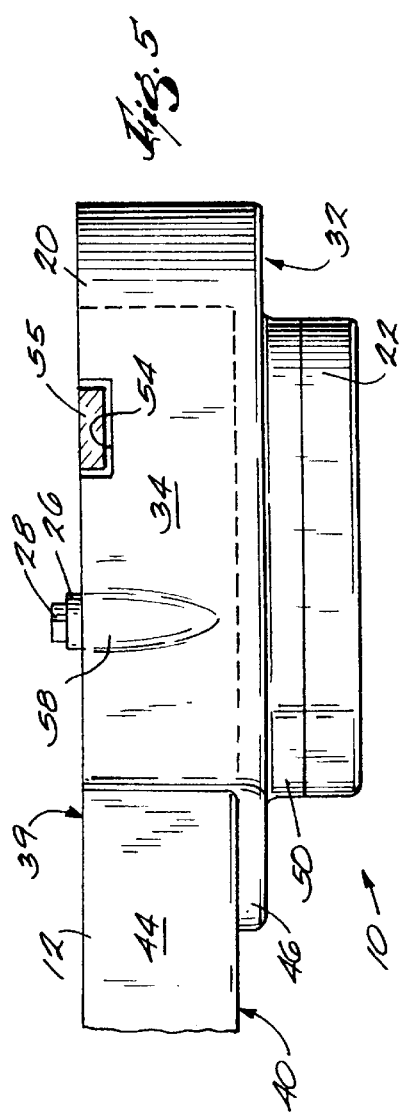
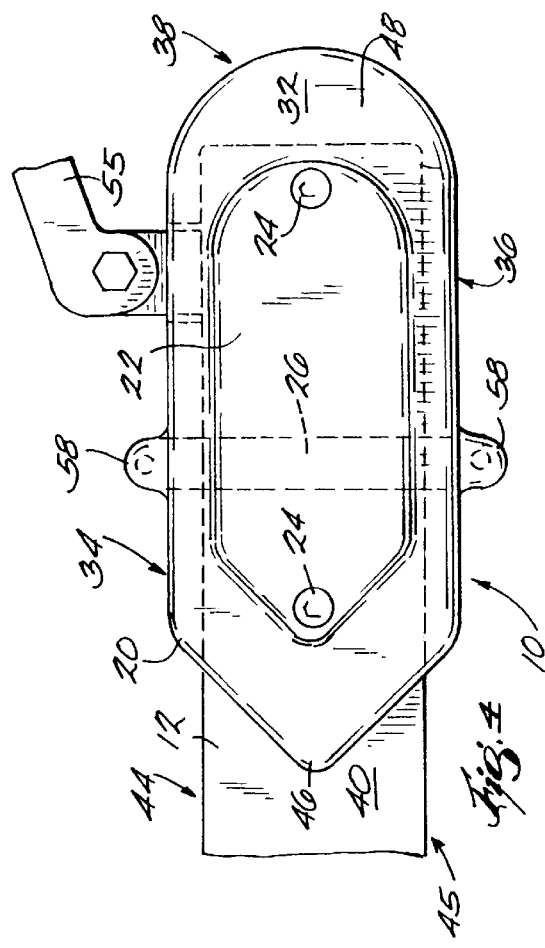

6,105,700

MOTORCYCLE SWINGARM COVER

FIELD OF THE INVENTION

The present invention generally relates to the field of motorcycle rear axle covers and adjuster end caps.

BACKGROUND OF THE INVENTION

Motorcycles typically include a frame and a swingarm pivotally connected to the rear of the frame (e.g., either directly or through the engine). The swingarm supports the rear axle and rear wheel of the motorcycle. The rear axle typically extends through the swingarm, and is secured in place by an axle nut. The positioning of the axle relative to the swingarm can be changed by use of an axle adjuster. More specifically, the axle nut can be loosened and the adjuster can be used to move the rear axle relative to the swingarm to change the tension in the flexible drive member (e.g., a chain or belt).

For functional and aesthetic reasons, portions of the rear axle or adjuster are sometimes covered. For example, rear axles and corresponding axle nuts can be covered with an axle end cap or cover. Rear axle covers are functional and aesthetically pleasing additions to motorcycles. Similarly, axle adjusters can be covered with an adjuster end cap to enhance the function and aesthetics of the adjuster. Such covers and end caps are commonly brightly polished and/or have ornamental designs or logos. These covers and end caps may also reduce the amount of contaminants that reach and corrode these components.

SUMMARY OF THE INVENTION

The improved cover of the present invention recognizes the benefits of axle covers and adjuster end caps, and incorporates the two into a single swingarm cover to cover both the outer face and the end face of the swingarm to thereby cover both the axle and the adjuster in one integrated, aesthetic design. Separate axle covers and adjuster end caps, by comparison, have more parts and can be less aesthetically pleasing. The integrated design is also more structurally sound and provides more effective protection for the swingarm components.

More particularly, the invention provides a swingarm cover adapted to be mounted on a motorcycle swingarm and covering at least a portion of the outer face and at least a portion of the end face of the swingarm. For exampler the cover can be design to cover at least a portion of both the rear axle and the adjuster of the motorcycle. Preferably, the cover includes an opening for providing access to the rear axle, and an outer member detachably mounted to the cover and positioned to cover the opening. The cover can be secured to the swingarm by a clamping bar adapted to positioned against an inner face of the swingarm and interconnected with the cover to maintain the cover mounted on the swingarm. The cover can further include a notch for receiving a belt guard mounting arm of the motorcycle. Preferably, the cover wraps around at least a portion of the upper face and the lower face of the swingarm.

BRIEF DESCRIPTION OF THE DRAWINGS

FIG. 1 is a side view of a motorcycle embodying the present invention.

FIG. 2 is an enlarged perspective view of a swingarm cover embodying the present invention and mounted on a motorcycle.

FIG. 3 is a perspective assembly view of the swingarm cover of FIG. 2.

FIG. 4 is a side view of the swingarm cover.

FIG. 5 is a top view of the swingarm cover.

FIG. 6 is an rear view of the swingarm cover.

Before one embodiment of the invention is explained in detail, it is to be understood that the invention is not limited in its application to the details of the construction and the arrangements of processes set forth in the following description or illustrated in the drawings. The invention is capable of other embodiments and of being practiced or being carried out in various ways. Also, it is understood that the phraseology and terminology used herein is for the purpose of describing the illustrated embodiment and should not be regarded as limiting the scope of the invention.

DETAILED DESCRIPTION

FIGS. 1–2 illustrate a swingarm cover 10 embodying to the present invention, as mounted to a motorcycle swingarm 12. The swingarm cover 10 depicted in the figures is mounted to the left side of the motorcycle. A similar swingarm cover may be reflected on the right side of the motorcycle.

As shown in FIGS. 1–2, the swingarm cover 10 substantially covers both the rear axle 14 and axle nut 16 on the side of the swingarm 12, and the axle adjuster 18 on the end of the swingarm 12. The illustrated swingarm cover 10 provides both functions in one integrated design. Such an integrated design is not only simpler and more structurally sound, but also more aesthetically pleasing when mounted on the motorcycle.

Referring to FIG. 3, the swingarm cover 10 comprises relatively few components as compared to separate covers and end caps. The cover 10 includes a body 20, an outer member 22 fastened to the body 20 by means of a pair of screws 24, and a clamping member 26 positioned on the opposite side of the swingarm 12 and held to the body by several screws 28 mounted through washers 30.

The body 20 of the swingarm cover 10 includes several features that make it both functional and aesthetically pleasing. As shown in FIG. 2, the body 20 fits relatively snugly over the end of the swingarm 12 and provides a smooth and integrated appearance. The particular shape of the body is one of design choice, but is guided by certain functional requirements. As shown in FIGS. 4–6, the body 20 essentially comprises an outer wall 32, a top wall 34, a bottom wall 36, and an end wall 38. The forward facing region of the swingarm cover 10 is open to allow passage of the swingarm 12. The outer wall 32 and the outer member 22 together cover the axle 14 and axle nut 16. The end wall 38 covers the adjuster 18.

In the illustrated embodiment, the inner facing region of the cover 10 is left open, with no components of the cover 10 except for the clamping bar 26 and associated hardware on the inner face 39 of the swingarm 12. This is because the rear axle 14, axle nut 16 and axle adjuster 18 extend from the outer face 40 and the end face 42 of the motorcycle swingarm 12, respectively. Therefore, those are the faces where the cover is desired. It is noted that the cover 10 also wraps around the upper face 44 and the lower face 45 of the swingarm 12.

The outer wall 32, as shown in FIG. 4, has a distinctive shape that includes a pointed end 46 toward the forward facing end of the motorcycle and a rounded end 48 at the rearward facing end of the motorcycle. The shape of the rounded end 48 of the body 20 must allow clearance for the adjuster 18 at the end of the swingarm 12. The outer wall 32 of the cover 10 includes an opening 49 for providing access to the rear axle, and a lip 50 is raised off the surface of the outer wall 32 around the opening 49. The lip 50 helps to provide clearance for the axle nut 16 and rear axle 14, which lie underneath this portion of the cover 10. Inside the lip 50 are a pair of inner bosses 52 (FIG. 3) which are integrated into the body 20 design. The inner bosses 52 include threads to mate to the screws 24 that hold the outer member 22 to the body 20.

As shown in FIGS. 5 and 6, the outer member 22 is mounted to the lip 50 of the body 20 and is designed to cover the opening 49 in the body 20. The outer member 22 gives adequate clearance for the axle nut 16 and axle 14 underneath. As shown in FIG. 4, the outer member 22 may have a shape or design that is integrated into the design of the cover 10 by making the outer member 22 similar in shape to the body 20 itself. As a further functional advantage, the outer member 22 may be removed to tighten the axle nut 16 without removing the entire cover 10. An additional benefit of such a design is that the outer member 22 may be removed and replaced by a different outer member that includes a desired logo or design, such as information concerning the owner of the motorcycle or the specifications of the motorcycle.

As shown in FIGS. 3 and 5, the body 20 also includes a notch 54 that receives a mounting arm 55 from the drive belt guard 56. Additionally, the notch 54 helps to locate the cover 10 by preventing forward and aft movement of the cover 10. A cover that is reflected on the non-drive side of the motorcycle would not require the notch 54 because of the absence of a belt guard on the right side of the swingarm.

Also integrated into the body 20 are a pair of outer bosses 58 that extend from the top and bottom walls 34, 36 of the body 20. These outer bosses 58 include threaded holes to receive the screws 28 that mount through apertures 60 in the clamping bar 26. In this way, by tightening the screws 28 into the body 20, the cover 10 may be clamped tightly to the swingarm 12.

Because the cover 10 operates to protect the rear axle 14 and the axle adjuster 18 from corrosive elements in the environment, the swingarm cover 10 is preferably made of materials that are relatively resistant to corrosion. For example, the body 20 and outer member 22 may be made of die casted zinc and then chrome plated for a durable, shiny appearance. Alternatively, the body 20 and outer member 22 may be machined from billet aluminum and surface treated to prevent corrosion. The cover 10 could also be made from plastic (e.g., chrome plated plastic). Further, the clamping bar 26 and screws 24, 28 are preferably made of a stainless steel or other noncorrosive material.

In this way, the cover 10 that is provided by the invention not only serves to protect components of the motorcycle, but also gives a aesthetically pleasing integrated appearance to the swingarm 12 of the motorcycle. Moreover, the cover 10 is essentially made of an integrated, solid design, and is strong and simple to use.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described herein are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A motorcycle comprising:
   a frame;
   a swingarm connected to said frame, said swingarm having an outer face and an end face;
   a rear axle mounted to said swingarm and having a portion protruding from said outer face;
   an adjuster mounted to said end face;
   a cover mounted on said swingarm and covering at least a portion of said outer face, at least a portion of said end face, at least a portion of said rear axle, and at least a portion of said adjuster, wherein said cover includes an opening for providing access to said rear axle; and
   an outer member detachably mounted to said cover and positioned to cover said opening.

2. A motorcycle as claimed in claim 1, further comprising a clamping bar positioned against an inner face of said swingarm and interconnected with said cover to maintain said cover mounted on said swingarm.

3. A motorcycle as claimed in claim 1, further comprising a belt guard and a mounting arm connecting said belt guard to said swingarm, wherein said cover includes a notch in which said mounting arm is positioned.

4. A motorcycle as claimed in claim 1, wherein said swingarm includes an upper face, and wherein said cover wraps around at least a portion of said upper face.

5. A motorcycle as claimed in claim 1, wherein said swingarm includes a lower face, and wherein said cover wraps around at least a portion of said lower face.

6. A motorcycle comprising:
   a frame;
   a swingarm connected to said frame, said swingarm having an outer face;
   a rear wheel axle mounted to said swingarm and having a portion protruding from said outer face; and
   a cover mounted on said swingarm and covering at least a portion of said outer face, said cover including an opening for providing access to said wheel axle.

7. A motorcycle as claimed in claim 6, further comprising an adjuster mounted to said end face, wherein said cover is positioned to cover at least a portion of said adjuster.

8. A motorcycle as claimed in claim 6, further comprising an outer member detachably mounted to said cover and positioned to cover said opening.

9. A motorcycle as claimed in claim 6, further comprising a clamping bar positioned against an inner face of said swingarm and interconnected with said cover to maintain said cover mounted on said swingarm.

10. A motorcycle as claimed in claim 6, further comprising a guard mount mounted to said swingarm, wherein said cover includes a notch in which said guard mount is positioned.

11. A motorcycle as claimed in claim 6, wherein said swingarm includes an upper face, and wherein said cover wraps around at least a portion of said upper face.

12. A motorcycle as claimed in claim 6, wherein said swingarm includes a lower face, and wherein said cover wraps around at least a portion of said lower face.

13. A motorcycle swingarm cover adapted to be mounted onto a swingarm of a motorcycle, the swingarm having an outer face and an end face, said cover comprising:

a body including:
- an outer wall adapted to cover at least a portion of the outer face of the swingarm, said outer wall including an opening for providing access to the rear axle;
- an outer member detachably mounted to said outer wall and positioned to cover said opening; and
- an end wall connected to the outer wall and adapted to cover at least a portion of the end face of the swingarm; and a fastener adapted to secure the body to the swingarm.

14. A motorcycle swingarm cover as claimed in claim 13, wherein said fastener includes a clamping bar detachably connected to said body.

15. A motorcycle swingarm cover as claimed in claim 13, wherein said body includes a notch adapted to receive a belt guard mounting arm of a motorcycle.

16. A motorcycle comprising:

a frame;

a swingarm connected to said frame, said swingarm having an outer face and an end face;

a cover mounted on said swingarm and covering at least a portion of said outer face and at least a portion of said end face;

a belt guard; and a mounting arm connecting said belt guard to said swingarm, wherein said cover includes a notch in which said mounting arm is positioned.

* * * * *